Figure 1:
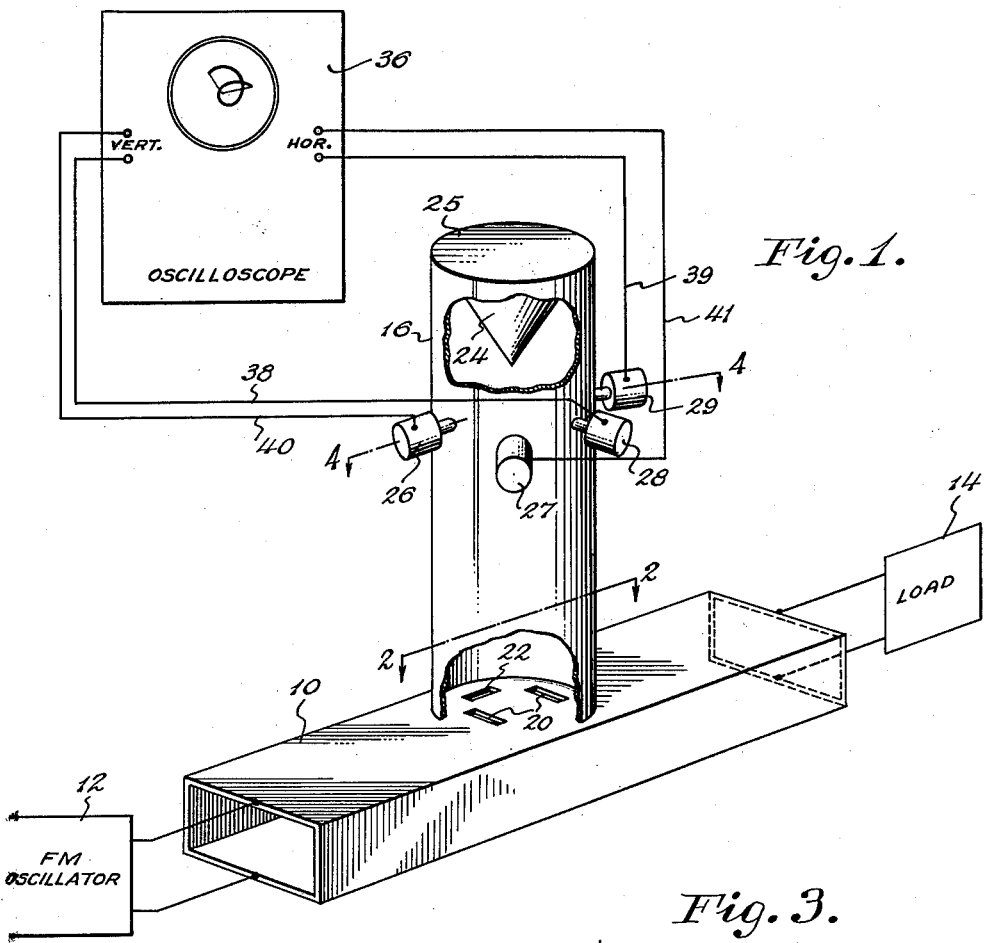

Nov. 8, 1955  S. B. COHN  2,723,377
CIRCULAR POLARIZATION COUPLING FOR RECTANGULAR WAVEGUIDE
Filed June 28, 1951  2 Sheets-Sheet 1

INVENTOR
SEYMOUR B. COHN
BY
Paul B. Hunter
ATTORNEY

Nov. 8, 1955 S. B. COHN 2,723,377
CIRCULAR POLARIZATION COUPLING FOR RECTANGULAR WAVEGUIDE
Filed June 28, 1951 2 Sheets-Sheet 2

INVENTOR
SEYMOUR B. COHN
BY
Paul B. Hunter
ATTORNEY or standing-wave detectors for ultra-high-frequency systems.

In order to properly adjust systems for the transmission of ultra-high-frequency energy, it is ordinarily necessary that the impedances which are coupled to the system be proportioned so that the standing waves along the transmission system are minimized or completely eliminated. Impedance meters are employed to determine the characteristics of such systems so that the impedances may be properly proportioned.

Standing-wave detectors are commonly used to make impedance measurements and to determine when the standing waves along the transmission system are minimized. Most of the known standing-wave detectors must be operated manually and consequently require a considerable amount of time to make the required measurements. Furthermore, time-consuming calculations must be made in order to determine the impedance characteristics of a transmission system after the standing-wave ratio has been measured.

In an article entitled "An Oscillographic Method of Presenting Impedances on the Reflection-Coefficient Plane" published by A. L. Samuel in the Proceedings of the Institute of Radio Engineers for November 1947, page 1279, apparatus is disclosed for automatically measuring the impedance characteristics of a transmission system. However, the apparatus disclosed by Samuel has a rather narrow frequency range since the accuracy of the measurements is dependent upon quarter wavelength spacing of pickup probes along the transmission line.

Figure 2:
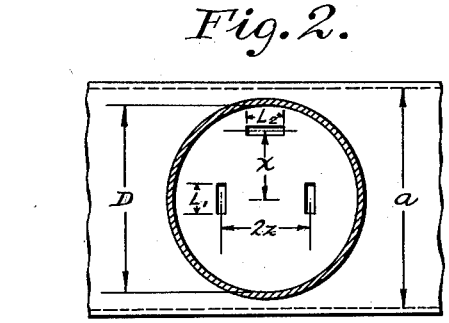
Figure 4:
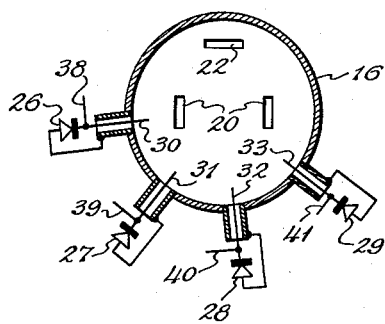
Figure 5:
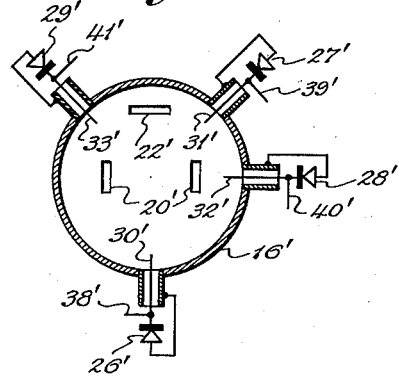
Figure 6:
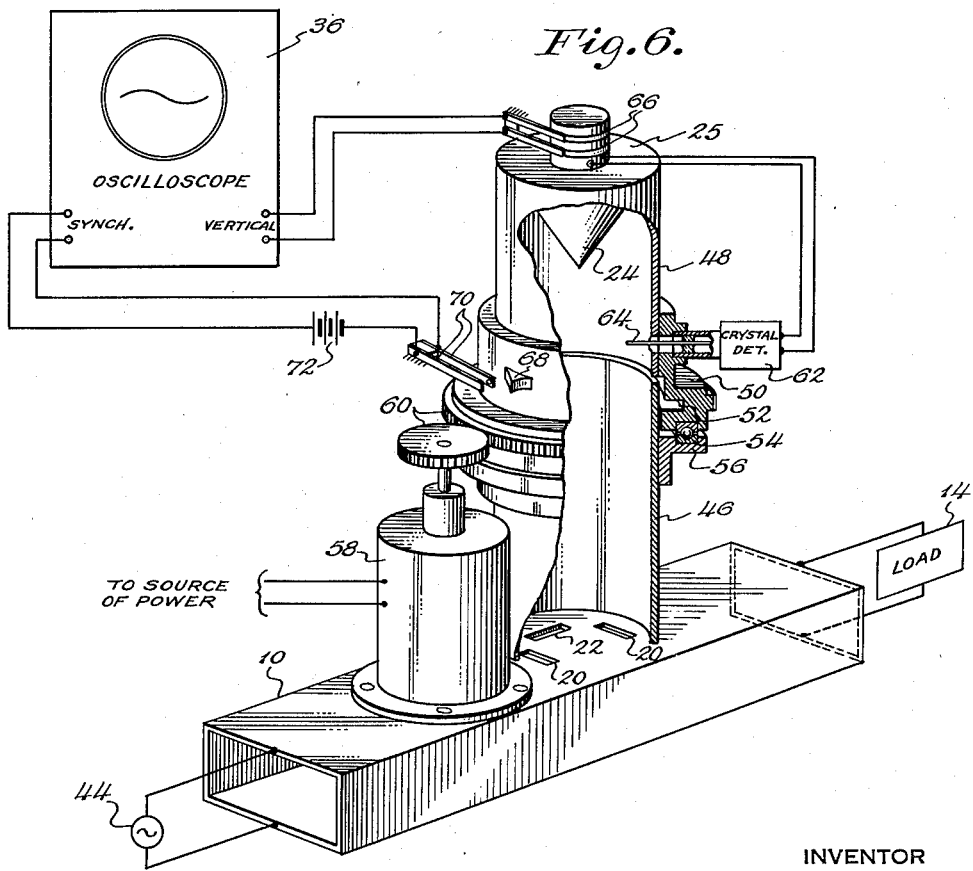

These difficulties are minimized in the present invention by providing apparatus for automatically providing impedance or standing-wave measurements over a wide range of frequencies. In accordance with the present invention, a rectangular wave guide is employed as part of the transmission system for conveying the ultra-high-frequency energy, and a circular wave guide, which is coupled to the rectangular wave guide by means of a broad-band coupling arrangement, is employed to permit measurement of the standing waves. The coupling between the rectangular and the circular wave guides serves to transform unidirectional energy from the rectangular wave guide to circularly polarized energy in the circular wave guide, the direction of rotation being determined by the direction of travel of the energy in the rectangular wave guide. Two means for detecting the energy in the circular wave guide may be employed. Four detectors coupled to the circular wave guide in a common plane may be employed in conjunction with an oscilloscope to automatically provide a Smith Chart presentation of the measurements, or a single detector which is coupled to the circular wave guide and rotated circumferentially therearound may be employed in conjunction with an oscilloscope to automatically provide a measurement of the standing-wave ratio of the energy which is conveyed by the rectangular wave guide.

tions of the coupling slots shown in Fig. 2;
Fig. 4 shows a sectional view along line 4—4 of Fig. 1;
Fig. 5 shows an alternative arrangement for the apparatus shown in Fig. 4; and
Fig. 6 is an alternative embodiment of the invention.
Fig. 1 shows one embodiment of the impedance meter of the present invention, wherein an oscilloscope serves to portray a Smith Chart presentation of the magnitude and phase of the reflected wave along the transmission system.

A wave guide 10 of rectangular cross-section serves as part of the transmission system between a source 12 of frequency-modulated ultra-high-frequency energy and a load 14. The rectangular wave guide 10 serves to convey energy of the $TE_{1,0}$ mode.

A wave guide 16 of circular cross-section is joined at right angles to the rectangular wave guide 10, and the two wave guides are intercoupled by means of suitable apertures in the wall of the rectangular wave guide 10 so that a small portion of the energy of the $TE_{1,0}$ mode in the rectangular wave guide 10 is coupled to the circular wave guide 16 and so that the energy in the circular wave guide 16 is of the circularly polarized $TE_{1,1}$ mode.

Various coupling arrangements may be employed to couple the rectangular wave guide 10 to the circular wave guide 16 so that the $TE_{1,0}$ mode of energy in the rectangular wave guide 10 is converted to the $TE_{1,1}$ circularly polarized mode in the circular wave guide 16. For example, one slot disposed at right angles to the axis of the rectangular wave guide 10 and another slot disposed parallel to and offset from the axis of the rectangular wave guide 10 could be employed. Also, a pair of slots which cross one another at right angles and which are offset from the axis of the rectangular wave guide 10, could be employed. However, such arrangements serve to produce circularly polarized energy over a rather narrow band of frequencies.

Fig. 2 shows a preferred coupling slot arrangement which serves to produce circularly polarized energy over a wide range of frequencies.

Circular polarization is achieved over a wide range of frequencies when $$p|A_{ax}|=|A_{az}|$$

where $A_{ax}$ and $A_{az}$ are the respective wave amplitudes at a frequency near the center of the band of the two components which constitute the circularly polarized wave in the circular wave guide 16, and $p$ is a constant which is slightly greater than unity.

Substituting the equations which define the respective wave amplitudes gives $$\frac{M_2\lambda_g J_1(\alpha x)\sin\frac{\pi x}{a}}{xa}=\frac{4M_1J_1(\alpha z)\cos\frac{2\pi z}{\lambda_g}}{pz}$$

where $M_1$ is the magnetic polarizability of the slots 20, $M_2$ is that of slot 22, $\lambda_g$ is the guide wavelength in the rectangular wave guide 10, $J_1$ is a Bessel function, $\alpha$ equals $2\pi$ divided by the cut-off wavelength in the circular wave guide 16, $a$ is the width of the rectangular wave guide 10, $x$ is the distance from the axis of the rectangular wave guide 10 to the center of the slot 22, and $z$ is one-half the distance between the slots 20.

Figure 3:
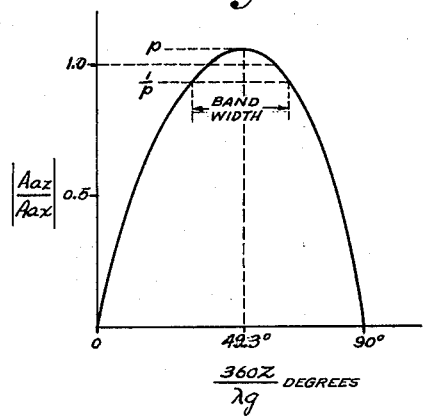

Fig. 3 shows a curve which represents the ratio $$\left|\frac{A_{az}}{A_{ax}}\right|$$

as a function of $$\frac{360z}{\lambda_g}$$

degrees. The peak of the curve occurs at $$\frac{360z}{\lambda_g} = 49.3 \text{ degrees}$$

and the constants are chosen so that at the peak, $p$ is slightly greater than 1, such as 1.02, for example. The effective band-width of the coupler is shown in Fig. 3 for a particular value of $p$.

Using the preferred values $p=1.02$ and $$\frac{360z}{\lambda_g} = 49.3 \text{ degrees}$$

the locations and sizes of the slots 20 and 22 may be determined as follows:

Let $$\frac{\lambda}{a} = 1.25$$

$$\frac{\lambda_g}{a} = 1.60$$

Preferably, the ratio of the diameter of the circular wave guide 16 to the wavelength of the energy in free space is selected so that the center of the operating frequency range for the circular wave guide 16 is approximately half way between the cut-off frequency of the fundamental mode and the next higher note of energy for the circular wave guide 16. This fixes the relationship between the diameter of the circular wave guide 16 and the wavelength as follows:

$$D = .667\lambda$$

where D is the inner diameter of the circular wave guide 16.

$$2z = 2\left(\frac{49.3}{360}\right)\lambda_g = 0.350\lambda$$

Then $$\frac{J_1(\alpha x)\left(\sin\frac{\pi x}{a}\right)}{x/\lambda} = \frac{3.93 M_1}{M_2}$$

Now let $$x = 0.25\lambda$$

Then $$\frac{M_2}{M_1} = \frac{3.93}{1.79} = 2.20$$

If $w/L$ is the same for all of the slots, then $$\frac{M_2}{M_1} = \left(\frac{L_2}{L_1}\right)^3$$

where $L_1$ is the length of the slots 20 and $L_2$ is the length of the slot 22. If $L_1=0.10\lambda$, then $L_2=0.130\lambda$. If $w_1=0.1L_1$, then $w_2=0.1L_3$, where $w_1$ is the width of the slots 20 and $w_2$ is the width of the slot 22.

When the three-slot coupling arrangement is employed, it may be necessary to modify the calculated dimensions slightly in order to correct for distortions caused by the thickness of the metal in which the slots are located and other second order effects. This modification is done experimentally.

When one of the coupling arrangements described above is employed between the rectangular wave guide 10 and the circular wave guide 16, waves travelling in one direction in the rectangular wave guide 10 cause waves having one direction of rotation in the circular wave guide 16, and waves travelling in the oppostie direction in the rectangular wave guide 10 cause waves having the opposite direction of rotation in the circular wave guide 16. Accordingly, when standing waves exist along the rectangular wave guide 10, a standing wave is produced around the periphery of the circular wave guide 16, and the VSWR around the periphery of the circular wave guide 16 is equal to the VSWR along the rectangular wave guide 10. Exactly one wavelength occurs around the circumference at all frequencies.

The circular wave guide 16 is terminated in a matched load, such as the conically-shaped dissipative member 24, which is secured to the end plate 25 which closes the end of the circular wave guide 16, so that no reflections will be produced within the circular wave guide 16.

A Smith chart presentation of the magnitude and phase of the reflected wave in the rectangular wave guide 10 is produced by means of the detecting apparatus shown in Fig. 1.

Four crystal detectors 26–29 are coupled to the circular wave guide 16 by means of the probes 30–33 (see Fig. 4) which are located around the periphery of the circular wave guide 16 in a plane at right angles to the axis of the circular wave guide 16. One terminal of each of the crystal detectors 26–29 is connected to the circular wave guide 16, and the other terminals of the crystal detectors 26–29 are connetced to the vertical and the horizontal deflection circuits of an oscilloscope 36 by means of the leads 38–41.

In order to avoid the effects of fringing electromagnetic fields, the probes 30–33 should be located about twice the diameter of the circular wave guide 16 away from the slots 20 and 22 and about one and one-half times the diameter of the circular wave guide 16 away from the end plate 25 which closes the end of the circular wave guide 16.

The angular locations of the probes 30–33 around the periphery of the circular wave guide 16 may be as shown in Fig. 4, wherein the probes 30–33 are spaced 45 degrees apart. The signals produced by the detectors 26 and 28 are applied over the leads 38 and 40 to the vertical deflection circuit of the oscilloscope 36, so that the vertical deflection of the electron beam of the oscilloscope 36 varies in accordance with the difference between the magnitudes of the signals produced by the crystal detectors 26 and 28. The signals produced by the detectors 27 and 29 are applied over the leads 39 and 41 to the horizontal deflection circuit of the oscilloscope 36, so that the horizontal deflection of the electron beam of the oscilloscope 36 varies in accordance with the difference between the magnitudes of the signals produced by the crystal detectors 27 and 29.

The locations of the probes 30–33 may be arranged in various other manners as long as the pairs of detectors which are coupled to the respective deflection circuits of the oscilloscope 36 are located at positions spaced 90 degrees apart around the periphery of the circular wave guide 16, and the adjacent couplings of the respective pairs of detectors are located at positions spaced an odd multiple of 45 degrees around the periphery of the circular wave guide 16.

Fig. 5 shows one of the possible alternative arrangements. The elements which correspond to the elements shown in Fig. 4 are designated by the same numbers primed.

The detectors 29—29 should be the square law type, and they should be balanced.

For the embodiment of the invention shown in Fig. 1, the source 12 of ultra-high-frequency energy should be frequency modulated over a small range of frequencies, and preferably the output of the source 12 should be interrupted at the end of each frequency excursion.

The signal applied to the vertical deflection circuit of the oscilloscope 36 varies in accordance with $2V_iV_r \cos\theta$, where $V_i$ is the amplitude of the incident wave which travels from the source 12 to the load 14 along the rectangular wave guide 10, $V_r$ is the amplitude of the wave which is reflected by the load 14 along the rectangular wave guide 10, and $\theta$ is the angle of the reflection coefficient at some particular reference plane. Similarly the signal applied to the horizontal deflection circuit varies in accordance with $2V_iV_r \sin\theta$.

Thus, when each frequency excursion of the source 12 occurs, the beam of the oscilloscope 36 will produce a trace on the screen of the cathode-ray tube which represents a polar plot of the magnitude and phase of the reflected wave $V_r$, if $V_i$ is held constant.

Such a presentation corresponds to a Smith Chart presentation, and the center of the reflection-coefficient plane on the chart is located when the spot returns to its undeflected position each time that the output of the source 12 is interrupted.

The proper scale factor for the oscilloscope 36 and its amplifiers may be obtained by employing a short circuit for the load 14, so that $|V_r|=|V_i|$. The deflection is then unity since $V_r$ for unity $V_i$ is the reflection coefficient.

When a suitable load 14 is employed to terminate the wave guide 10, the reflection coefficient is given by the vector distance from the origin to the desired point on the reflection-coefficient plane, which point may be located on the curve which is portrayed on the cathode-ray tube of the oscilloscope 36.

The Smith Chart presentation produced by the apparatus disclosed in Fig. 1 is the same presentation as is produced by the apparatus disclosed in the aforementioned article by Mr. A. L. Samuel, and reference may be had to the Samuel article for a discussion as to how the information with respect to the reflection coefficient may be employed.

The embodiment of the invention shown in Fig. 6 serves to automatically produce an indication of the VSWR along a transmission system.

Referring now to Fig. 6, as before, a rectangular wave guide 10 serves as part of the transmission system between a source 44 of ultra-high-frequency energy and a load 14. In this embodiment of the invention the source 44 need not be frequency-modulated.

A section of a circular wave guide 46 is joined at right angles to the rectangular wave guide 10, and the two wave guides are intercoupled by means of suitable apertures in the wall of the rectangular wave guide so that energy of the $TE_{1,0}$ mode in the rectangular wave guide 10 is transformed to the circularly polarized $TE_{1,1}$ mode which is coupled to the circular wave guide 46. Preferably, the coupling apertures are the type disclosed in Fig. 2.

A second section of circular wave guide 48, which is rotatable with respect to the section of circular wave guide 46, is secured coaxially with respect to the wave guide section 46 by means of a sleeve 50. The sleeve 50 contains a choke or wave-trap 52 which serves to prevent the escape of energy at the joint between the wave guide sections 46 and 48. A bearing 54, which is secured on an annular support 56 which is rigidly attached to the section of wave guide 46, serves to support the sleeve 50 and the section of wave guide 48 so that they are rotatable with respect to the section of wave guide 46.

The sleeve 50 and the section of wave guide 48 are rotated by means of a motor 58 and a pair of gears 60.

A crystal detector 62 is coupled to the section of wave guide 48 by means of a probe 64, and the output of the detector 62 is applied to the vertical deflection circuit of an oscilloscope 36 through a pair of slip-rings 66.

The sweep of the oscilloscope 36 is synchronized with the rotation of the probe 64 by means of a signal which is produced each time that a protrusion 68, which is mounted on the sleeve 50, causes a set of contacts 70 to close and connect a battery 72 across the synchronizing circuit of the oscilloscope 36.

Thus, the circular wave guide sections 46 and 48 constitute a circular wave guide which is excited by circularly polarized waves by means of the slots 20 and 22, and the portion 48 of the circular wave guide which supports the detector 62 and the probe 64 are rotatable.

As before, the circular wave guide 46, 48 is terminated in a matched load 24.

When standing waves exist along the rectangular wave guide 10, a corresponding standing wave is produced around the periphery of the circular wave guide 46, 48.

This standing wave is detected by the crystal detector 62 and the amplitude of the standing wave is portrayed directly on the screen of the oscilloscope 36. In making one revolution, the probe 64 and the detector 62 will detect one phase wavelength of the standing wave in the circular wave guide 46, 48.

In order to avoid the effects of fringing electromagnetic fields, the probe 64 should be located about one-fourth the diameter of the circular wave guide 46 away from the joint between the wave guide sections 46, 48, about twice the diameter of the circular wave guide 46 away from the slots 20, 22, and about one and one-half times the diameter of the circular wave guide 46 away from the end plate 25 which closes the end of the circular wave guide 48.

Since many changes could be made in the apparatus described above and many apparently widely different embodiments of this invention could be made without departing from the scope thereof, it is intended that all matter contained in the above description or shown in the accompanying drawings shall be interpreted as illustrative and not in a limiting sense.

I claim:

1. Ultra-high-frequency apparatus comprising a section of wave guide having a rectangular cross-section, and a section of wave guide having a circular cross-section connected at right angles to one of the broad sides of said rectangular wave guide, said two wave guide sections being intercoupled by means of three slots spaced apart in the wall of said rectangular wave guide, two of the slots being disposed at right angles to the axis of the rectangular wave guide and the third slot being disposed parallel to and offset from the axis of the rectangular wave guide for coupling the $TE_{1,0}$ mode of energy in the rectangular wave guide to the $TE_{1,1}$ circularly polarized mode of energy in the circular wave guide.

2. Ultra-high-frequency apparatus comprising a section of wave guide having a rectangular cross-section, said section of wave guide having means at one end thereof adapted for coupling to a source of ultra-high-frequency energy and having means at the other end thereof adapted for coupling to a load, means including a section of wave guide having a circular cross-section with one of its ends joined to one of the broad sides of said rectangular wave guide with the longitudinal axis of said circular wave guide extending perpendicular to and intersecting the longitudinal axis of said rectangular wave guide, and means for intercoupling said two wave guides including three elongated openings spaced apart and disposed in the common wall separating said rectangular wave guide from said circular wave guide, two of said elongated openings extending in a direction perpendicular to the longitudinal axis of said rectangular wave guide and the other of said elongated openings extending in a direction parallel to and offset from the longitudinal axis of said rectangular wave guide.

3. An ultra-high-frequency mode changer comprising a section of wave guide having a rectangular cross-section and adapted for conveying ultra-high-frequency energy of the $TE_{1,0}$ mode, means adapted for coupling one end of said rectangular wave guide to a source of ultra-high-frequency energy, means adapted for coupling the other end of said rectangular wave guide to a load, means including a section of wave guide having a circular cross-section with one of its ends joined to one of the broad sides of said rectangular wave guide with the longitudinal axis of said circular wave guide extending perpendicular to the longitudinal axis of said rectangular wave guide, means for intercoupling said two wave guides for converting the energy of the TE$_{1,0}$ mode in said rectangular wave guide into energy of the TE$_{1,1}$ circularly polarized mode in said circular wave guide, said intercoupling means including three elongated openings spaced apart and disposed in the common wall separating said rectangular wave guide from said circular wave guide, two of said elongated openings extending in a direction perpendicular to the longitudinal axis of said rectangular wave guide and the other of said elongated openings extending in a direction parallel to and offset from the axis of said rectangular wave guide, and a dissipative termination disposed at the other end of said circular wave guide opposite said intercoupling means.

4. An ultra-high-frequency mode changer as defined in claim 3 wherein the diameter of said section of wave guide having a circular cross-section is less than the width of the broad side of said section of wave guide having a rectangular cross-section.

5. Ultra-high-frequency apparatus comprising a section of wave guide having a rectangular cross-section, said section of wave guide having means at one end thereof adapted for coupling to a source of ultra-high-frequency energy and having means at the other end thereof adapted for coupling to a load, and means including a section of wave guide having a circular cross-section with one of its ends joined to one of the broad sides of said rectangular wave guide with the longitudinal axis of said circular wave guide perpendicular to the longitudinal axis of said rectangular wave guide, said two wave guide sections being intercoupled by means of three elongated slots spaced apart and disposed in the common wall separating said rectangular wave guide from said circular wave guide, two of the elongated slots extending in a direction perpendicular to the longitudinal axes of said rectangular wave guide and said circular wave guide and situated equi-distant from the longitudinal axis of said circular wave guide, and the third elongated slot extending in a direction parallel to the longitudinal axis of said rectangular wave guide and situated between the longitudinal axis of said circular wave guide and the side wall of said rectangular wave guide equi-distant from each of said first two elongated slots.

6. Ultra-high-frequency apparatus as defined in claim 5, wherein said two elongated slots extending in a direction perpendicular to the longitudinal axes of said rectangular wave guide and said circular wave guide are separated by a distance equal to substantially $$\frac{49.3}{180}$$

times the guide wavelength in said rectangular wave guide, and wherein said two elongated slots are symmetrically disposed with respect to a line perpendicular to the longitudinal axes of said rectangular wave guide and said circular wave guide extending through the center of said circular wave guide.

7. Ultra-high-frequency apparatus comprising a section of wave guide having a rectangular cross-section, said section of wave guide having means at one end thereof adapted for coupling to a source of ultra-high-frequency energy and having means at the other end thereof adapted for coupling to a load, and means including a section of wave guide having a circular cross-section with one of its ends joined to one of the broad sides of said rectangular wave guide with the longitudinal axis of said circular wave guide perpendicular to the longitudinal axis of said rectangular wave guide, said two wave guide sections being intercoupled by means of three elongated slots spaced apart and disposed in the common wall separating said rectangular wave guide from said circular wave guide, two of the elongated slots extending in a direction perpendicular to the longitudinal axes of said rectangular wave guide and said circular wave guide and situated symmetrically with respect to a line perpendicular to the longitudinal axes of said rectangular wave guide and said circular wave guide extending through the center of said circular wave guide, said two elongated openings being spaced apart between centers by a distance equal to substantially $$\frac{49.3}{180}$$

times the guide wavelength in said rectangular wave guide with the centers of these two elongated openings situated midway between the narrow side walls of said rectangular wave guide, and the third elongated slot extending in a direction parallel to the longitudinal axis of said rectangular wave guide and situated at a perpendicular distance $x$ from a line joining the centers of said first two elongated slots to the center of said third elongated slot, said perpendicular distance $x$ being measured along the perpendicular bisector line of the centers of said first two elongated slots, the distance $x$ being chosen in relation to the length $L_1$ of said first two elongated slots and the length $L_2$ of said third elongated slot to satisfy the equation $$\frac{\lambda_g J_1(\alpha x) \sin \frac{\pi x}{a}}{xa} = \left(\frac{L_1}{L^2}\right)^3 \frac{4 J_1(\alpha \mathscr{Z}) \cos \frac{2\pi \mathscr{Z}}{\lambda_g}}{p\mathscr{Z}}$$

where $J_1$ is a Bessel function, $\alpha$ equals $2\pi$ divided by the cut-off wavelength in said circular wave guide, $a$ is the width of the broad side of said rectangular wave guide, $\lambda_g$ is the guide wavelength in the rectangular wave guide, $\mathscr{Z}$ is one half the distance between centers of said first two elongated slots, $p$ is a constant slightly greater than unity, and where the ratio of the width of the slots to their lengths is the same for all three slots, whereby energy of the TE$_{1,0}$ mode in said rectangular wave guide is converted into energy of the TE$_{1,1}$ circularly polarized mode in said circular wave guide.

References Cited in the file of this patent

UNITED STATES PATENTS

| | | |
|---|---|---|
| 2,442,606 | Korman | June 1, 1948 |
| 2,445,348 | Ford | July 20, 1948 |
| 2,453,760 | Schelleng | Nov. 16, 1948 |
| 2,455,158 | Bradley | Nov. 30, 1948 |
| 2,471,021 | Bradley | May 24, 1949 |
| 2,472,785 | Blitz | June 14, 1949 |
| 2,474,268 | Marchand | June 28, 1949 |
| 2,602,859 | Moreno | July 8, 1952 |
| 2,605,323 | Samuel | July 29, 1952 |

FOREIGN PATENTS

| | | |
|---|---|---|
| 592,224 | Great Britain | Sept. 11, 1947 |